(12) United States Patent
Tajima et al.

(10) Patent No.: US 10,189,091 B2
(45) Date of Patent: Jan. 29, 2019

(54) MACHINE TOOL

(71) Applicants: CITIZEN WATCH CO., LTD., Tokyo (JP); CITIZEN MACHINERY CO., LTD., Nagano (JP)

(72) Inventors: Kensuke Tajima, Tokyo (JP); Shinji Fujita, Iruma (JP); Mitsuru Yamaura, Kawagoe (JP); Kazuyuki Izumi, Kawagoe (JP)

(73) Assignees: CITIZEN WATCH CO., LTD., Nishitokyo-Shi, Tokyo (JP); CITIZEN MACHINERY CO., LTD., Kitasaku-Gun, Nagano (JP)

( * ) Notice: Subject to any disclaimer, the term of this patent is extended or adjusted under 35 U.S.C. 154(b) by 9 days.

(21) Appl. No.: 15/519,118

(22) PCT Filed: Oct. 19, 2015

(86) PCT No.: PCT/JP2015/079454
§ 371 (c)(1),
(2) Date: Apr. 13, 2017

(87) PCT Pub. No.: WO2016/063837
PCT Pub. Date: Apr. 28, 2016

(65) Prior Publication Data
US 2017/0216933 A1    Aug. 3, 2017

(30) Foreign Application Priority Data
Oct. 23, 2014  (JP) ................................ 2014-216514

(51) Int. Cl.
*B23B 29/24* (2006.01)
*B23B 29/12* (2006.01)
*B23B 3/30* (2006.01)

(52) U.S. Cl.
CPC .............. *B23B 29/242* (2013.01); *B23B 3/30* (2013.01); *B23B 29/24* (2013.01); *B23Q 2220/002* (2013.01)

(58) Field of Classification Search
CPC ....... B23B 29/242; B23B 3/30; B23B 29/323; B23B 29/24; B23Q 2220/002
See application file for complete search history.

(56) References Cited

U.S. PATENT DOCUMENTS

| 4,087,891 A | 5/1978 | Schering |
| 2004/0211301 A1 | 10/2004 | Kobayashi et al. |
| 2005/0076757 A1 | 4/2005 | Kikuchi et al. |

FOREIGN PATENT DOCUMENTS

| CN | 2930926 Y | 8/2007 |
| CN | 201261071 Y | 6/2009 |

(Continued)

OTHER PUBLICATIONS

International Search Report issued in application No. PCT/JP2015/079454 dated Jan. 12, 2016 in 2 pages.

(Continued)

*Primary Examiner* — Sara Addisu
(74) *Attorney, Agent, or Firm* — Knobbe, Martens, Olson & Bear LLP (57) ABSTRACT

A simple machine tool including a relatively simple shaped turret having as many tool attachment parts as possible even when a cutout part for a movement path for a main spindle is provided. A machine tool includes a first main spindle, a second main spindle, a first turret having tool attachment parts, a second turret having tool attachment parts, and a controller having an indexing device. An edge of a cutout part formed in the second turret is a straight line in a direction crossing each side of a regular dodecagon centered at a turning center of the second turret, as seen in a Z axis (Continued)

direction, and each tool attachment part is disposed according to each side left in the regular dodecagon cut off by the cutout part.

5 Claims, 4 Drawing Sheets

(56) References Cited

FOREIGN PATENT DOCUMENTS

| | | |
|---|---|---|
| CN | 201338096 Y | 11/2009 |
| DE | 2656608 | 6/1977 |
| GB | 1512120 | 5/1978 |
| JP | 49-77289 | 7/1974 |
| JP | 53-54388 | 5/1978 |
| JP | 58-109203 | 6/1983 |
| JP | 03-126503 | 12/1991 |
| JP | 06-24894 | 4/1994 |
| JP | 09-253901 | 9/1997 |
| JP | 2003-225802 | 8/2003 |
| JP | 2003-340601 | 12/2003 |
| JP | 2014-008580 | 1/2014 |
| TW | I266666 | 11/2006 |
| TW | M344213 | 11/2008 |
| TW | M405316 | 6/2011 |
| WO | WO 03/084711 | 10/2003 |

OTHER PUBLICATIONS

Office Action in the corresponding Taiwanese Patent Application No. 104134688, dated Dec. 11, 2018.

MACHINE TOOL

CROSS-REFERENCE TO RELATED APPLICATIONS

This application is the U.S. National Phase under 35 U.S.C. § 371 of International Application No. PCT/JP2015/079454, filed on Oct. 19, 2015, which claims priority to Japanese Patent Application No. 2014-216514, filed on Oct. 23, 2014. The entire contents of these applications are incorporated herein by reference.

TECHNICAL FIELD

This invention relates to a machine tool including a turret.

BACKGROUND ART

A machine tool including a turret and a main spindle has been known (see JP2003-225802A, for example). The turret has on a circumferential surface thereof a plurality of s. The main spindle holds a workpiece. In the machine tool described in JP2003-225802A, the main spindle is provided in a movable manner along an axis line, and the turret is provided in a turnable manner to index each of the s relative to the main spindle. The turret includes a predetermined cutout part. By turning the turret such that the cutout part faces the main spindle, a movement path for the main spindle to pass through the turret is formed in the machine tool.

SUMMARY

However, the number of tool attachment parts of the turret is limited due to the cutout part. The turret has a relatively complex shape such as a biconcave lens shape as seen in the axis line direction of the main spindle. A relatively simple shaped turret is therefore required to have as many tool attachment parts as possible.

The present invention has been made in view of the above circumstances. An object of the present invention is to provide a machine tool including a relatively simple shaped turret having as many tool attachment parts as possible.

A machine tool according to the present invention includes a turret including, on a circumferential surface thereof, a plurality of tool attachment parts and a main spindle that holds a workpiece. The main spindle is provided in a movable manner along an axis line. The turret is provided in a turnable manner to index each of the tool attachment parts relative to the main spindle. The turret includes a predetermined cutout part. A movement path for the main spindle to pass through the turret is formed by turning the turret such that the cutout part faces the main spindle. The cutout part includes one plane along the axis line. The turret includes, on a circumferential surface thereof except for on the cutout part, the tool attachment parts.

According to the present invention as described above, the turret has a relatively simple shape even when the cutout part for the movement path for the main spindle is provided. As the tool attachment parts are provided over the circumference surface except for on the cutout part, as many tool attachment parts as possible are provided in the turret. With the simple shaped turret, for example, a shape of a spindle headstock of the main spindle which moves via the movement path formed by the cutout part is simplified. As a result, the machine tool is simplified.

The turret has, as seen in the axis line direction, a shape in which a part of a regular polygon centered at a turning center is linearly cut off by the edge of the cutout part, the edge is, as seen in the axis line direction, a straight line in a direction crossing each side of the regular polygon, and each tool attachment part is disposed according to each side left in the regular polygon cut off by the cutout part. As the edge of the cutout part is a simple straight line, the turret has, as seen in the axis line direction of the main spindle, a relatively simple shape such as an approximate half-moon shape in which at least two sides of the regular polygon are cut off by the cutout part. Each tool attachment part of the turret is disposed according to each side left in the regular polygon cut off by the cutout part. At least three sides of the regular polygon are cut off by the cutout part in accordance with the positional relationship between the turret and the main spindle. The cutout part is therefore formed by cutting off the minimum number of sides of the regular polygon, and thus, as many tool attachment parts as possible are provided in the turret.

The indexing device that turns the turret for each predetermined indexed angle to sequentially index each tool attachment part is configured to index the cutout part to face the main spindle by turning the turret at an angle different from the indexed angle according to the straight line formed by the edge of the cutout part. The movement path is easily formed by the turning operation of the turret with the indexing device, and the maintenance is easily performed.

DETAILED DESCRIPTION

Figure 1:
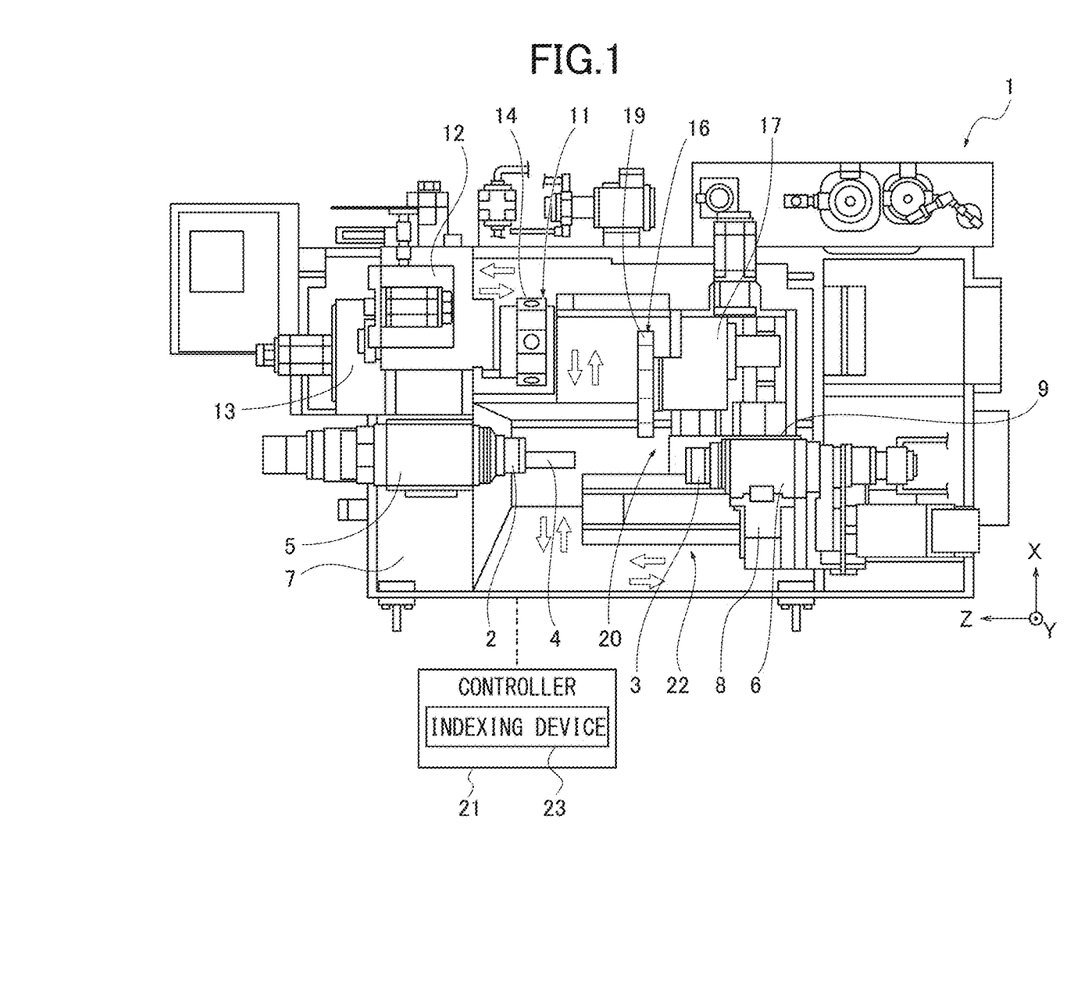
FIG. 1 is a schematic plane view illustrating one embodiment of an automatic lathe as a machine tool of the present invention.

Hereinafter, one embodiment of an automatic lathe as a machine tool according to the present invention will be described with reference to the drawings. As illustrated in FIG. 1, an automatic lathe 1 of the present embodiment includes a first main spindle 2 and a second main spindle 3 facing to each other. The first main spindle 2 and the second main spindle 3 grip a workpiece 4 as a machining target through a chuck, respectively.

The first main spindle 2 and the second main spindle 3 are supported in a rotatable manner by a first spindle headstock 5 and a second spindle headstock 6, respectively. The first spindle headstock 5 is fastened on a bed 7 of the automatic lathe 1. The second spindle headstock 6 is mounted on the bed 7 in a movable manner in a Z axis direction, which is the axis line directions of both main spindles 2, 3, and in an X axis direction orthogonal to the Z axis direction in the horizontal direction by a Z axis slide mechanism 8 and an X axis slide mechanism 9.

A first turret 11 is provided according to the first main spindle 2. Tools for machining the workpiece 4 gripped by the first main spindle 2 are mounted on the first turret 11. The first turret 11 and the first main spindle 2 are arranged side by side. The first turret 11 is mounted on the bed 7 in a movable manner in the X axis direction and the Z axis direction by an X axis turret slide mechanism 12 and a Z axis turret slide mechanism 13.

The first turret 11 is supported in a turnable manner with the Z axis direction as the axis line. The first turret 11 includes, on a circumferential surface thereof, tool attachment parts 14 for each predetermined indexed angle.

By turning the first turret 11, a predetermined tool attachment part 14 is indexed relative to the first main spindle 2 to select the tool of the indexed tool attachment part 14. The selected tool faces the workpiece 4 gripped by the first main spindle 2. The first turret 11 slides in the X axis direction and the Z axis direction by the X axis turret slide mechanism 12 and the Z axis turret slide mechanism 13 after the tool is selected. The workpiece 4 gripped by the first main spindle 2 is machined with the selected tool by the sliding of the first turret 11.

The second turret 16 is provided according to the second main spindle 3. Tools for machining the workpiece 4 gripped by the second main spindle 3 are mounted on the second turret 16. The second main spindle 3 and the second turret 16 are arranged side by side. The second turret 16 is supported by a support table 17 fastened to the bed 7 in a turnable manner with the Z axis direction as the axis line.

Figure 2:
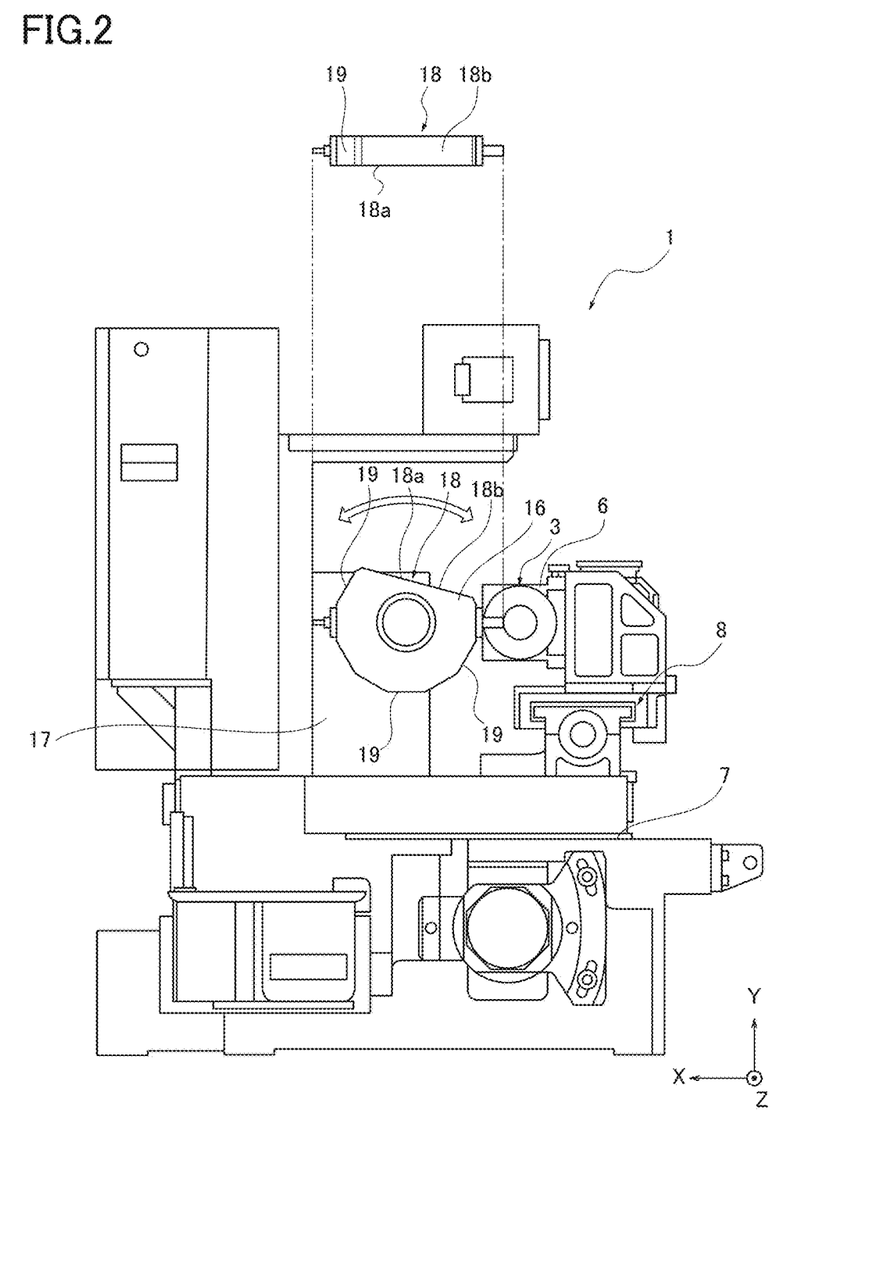
FIG. 2 is a schematic sectional view illustrating a relationship between a second main spindle and a second turret, and a predetermined tool attachment part indexed relative to the second main spindle.

As illustrated in FIGS. 2 to 4C, the second turret 16 has, as seen in the Z axis direction, a shape including a cutout part 18 in which a part of a regular dodecagon centered at a turning center O is cut off by a straight line. As illustrated in FIGS. 1, 2, the second turret 16 has a predetermined thickness in the Z axis direction.

The second turret 16 includes, on the circumferential surface thereof, tool attachment parts 19 for the tools according to the respective sides left in the partially cut regular dodecagon with the cutout part 18. By turning the second turret 16 at an indexed angle which is a center angle of the regular dodecagon, a predetermined tool attachment part 19 is indexed relative to the second main spindle 3 to select the tool of the indexed tool attachment part 19. The selected tool faces the workpiece 4 gripped by the second main spindle 3.

The second main spindle 3 slides in the X axis direction and the Z axis direction by the Z axis slide mechanism 8 and the X axis slide mechanism 9 after the tool is selected. The workpiece 4 gripped by the second main spindle 3 is machined with the selected tool by the sliding of the second main spindle 3.

The cutout part 18 is one flat surface (plane) 18b obtained by cutting off the second turret 16 with a plane along the Z axis direction. An edge 18a of the flat surface 18b (an edge corresponding to the cutout part 18 of the second turret 16) is a straight line as seen in the Z axis direction. In this embodiment, the cutout part 18 is formed such that the edge 18a becomes a straight line in the direction crossing each of all sides of the regular dodecagon of the circumferential surface of the second turret 16.

The second turret 16 turns such that the edge 18a follows the Y axis direction orthogonal to the Z axis direction and the X axis direction in the up and down direction, and the flat surface 18b follows a ZY plane by the Z axis and the Y axis. By turning the second turret 16, the cutout part 18 faces the second main spindle 3, so that a movement path 20 via which the second main spindle 3 straightly moves to the first main spindle 2 to pass through the second turret 16 is formed while the second main spindle 3 is positioned coaxially with the workpiece 4 gripped by the first main spindle 2.

A rectangular coordinate system on a horizontal plane is formed by the axis line (Z axis) in the Z axis direction and the axis line (X axis) in the X axis direction. A rectangular coordinate system on a vertical plane is formed by the Z axis and the axis line (Y axis) in the Y axis direction. The automatic lathe 1 includes a controller 21. For example, the rotations and the movements of the first main spindle 2, the first turret 11, the second main spindle 3, and the second turret 16 are controlled by the controller 21.

The workpiece 4 as the machining target is supplied to the first main spindle 2 of the above-described automatic lathe 1 by a not shown device for carrying a workpiece. The first main spindle 2 grips the supplied workpiece 4, and rotates. A predetermined tool is selected by the turning of the first turret 11. The workpiece 4 gripped by the first main spindle 2 is machined by the selected tool by appropriately sliding the first turret 11 in the X axis direction and the Z axis direction.

Figure 3:
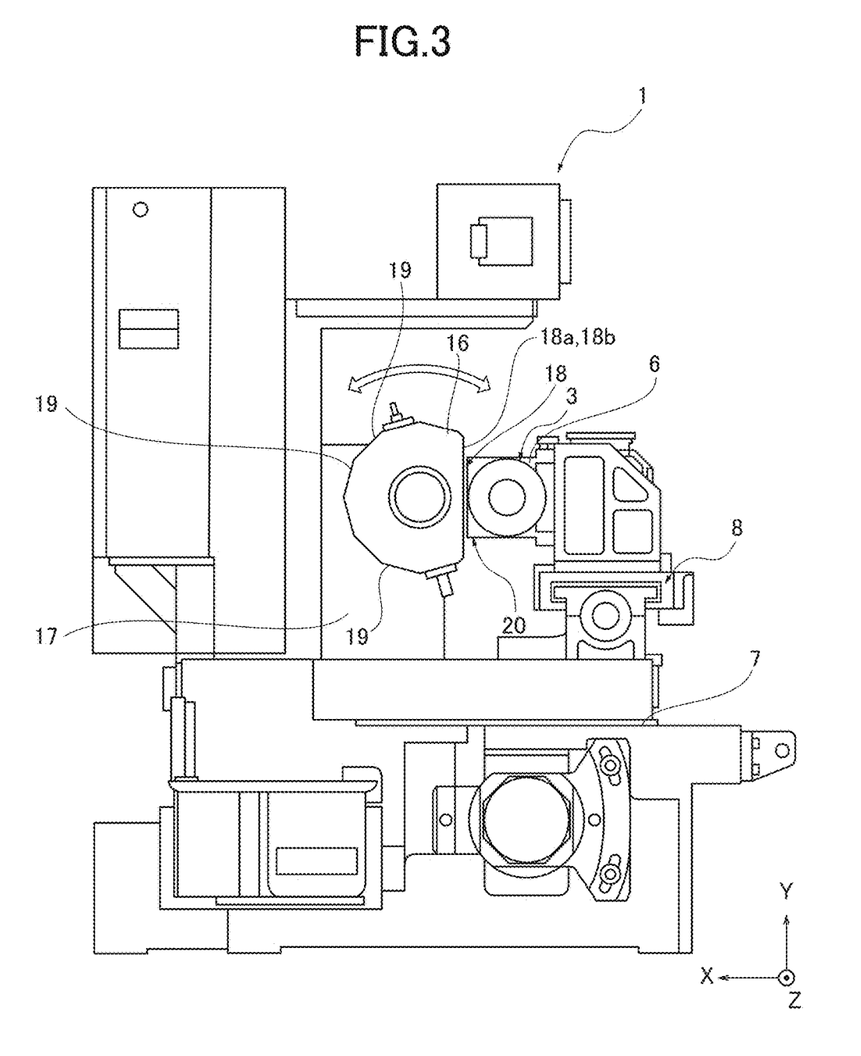
FIG. 3 is a schematic sectional view illustrating a relationship between the second main spindle and the second turret, a cutout part facing the second main spindle, and a movement path for the second main spindle.

After or until the machining of the workpiece 4 in the first main spindle 2 is completed, the second main spindle 3 slides in the X axis direction by the X axis slide mechanism 9, and is positioned coaxially with the workpiece 4 gripped by the first main spindle 2. In this case, the second turret 16 turns such that the edge 18a follows the Y axis direction and the flat surface 18b follows the ZY plane by the control of the controller 21, as illustrated in FIG. 3. The cutout part 18 thereby faces the second main spindle 3, and the movement path 20 is formed lateral to the cutout part 18.

The second main spindle 3 slides in the Z axis direction by the Z axis slide mechanism 8 while the second main spindle 3 is positioned coaxially with the workpiece 4 gripped by the first main spindle 2, and linearly moves to the first main spindle 2 in the Z axis direction to pass through the second turret 16 via the movement path 20. The cutout part 18 prevents the interference between the second main spindle 3 and the second turret 16. By such movement, the second main spindle 3 receives the workpiece 4 from the first main spindle 2 to be gripped.

The second main spindle 3 which grips the workpiece 4 slides in the Z axis direction by the Z axis slide mechanism 8, and linearly moves in a machining area 22 for machining the workpiece 4 via the movement path 20.

The second main spindle 3 rotates while gripping the workpiece 4. A predetermined tool is selected by turning the second turret 16. The workpiece 4 gripped by the second main spindle 3 is machined with the selected tool by appropriately sliding the second main spindle 3.

When the machining of the workpiece 4 in the second main spindle 3 is completed, the workpiece 4 is carried out from the automatic lathe 1 by a not shown device for carrying out a workpiece.

While the workpiece 4 is machined in the second main spindle 3, another workpiece 4 is machined in the first main spindle 2.

As described above, according to the present embodiment, the cutout part 18 provided in the second turret 16 is one flat surface (plane) 18b parallel to the Z axis direction. The shape of the second turret 16 is therefore relatively simplified. As the second turret 16 includes only one cutout part 18, and includes, on the circumferential surface thereof except for on the cutout part 18, the tool attachment parts 19 in addition to the cutout part 18, as many tool attachment parts 19 as possible are provided in the second turret 16.

The shapes of the second main spindle 3 and the second spindle headstock 6, which pass through the movement path 20, are simplified by the movement path 20 formed by the flat surface 18b. The configuration of the automatic lathe 1 is therefore simplified, the automatic lathe 1 is more freely designed, and the manufacturing efficiency and the cost performance of the automatic lathe 1 are also improved.

The second turret 16 has, as seen in the Z axis direction, a shape cut off by a straight line in a direction inclined relative to all sides of a regular polygon (in this embodiment, regular dodecagon). With this, as many sides as possible are left compared to a shape cut off by a straight line in a direction parallel to a predetermined side of a regular polygon.

More specifically, at least three sides are cut off when the regular polygon is cut off by the straight line in the direction parallel to the predetermined side. In this case, when the cutout part 18 is expanded according to the size of the second main spindle 3, at least five sides are cut off. On the other hand, at least two sides are cut off when the regular polygon is cut off by the straight line in the direction inclined to all sides as the present embodiment. In this case, when the cutout part 18 is expanded according to the size of the second main spindle 3, at least three sides are cut off. The second turret 16 therefore includes relatively many tool attachment parts 19 by providing the tool attachment parts 19 in the left respective sides.

That is to say, the second turret 16 is positioned relative to the second main spindle 3 disposed coaxially with the workpiece 4 gripped by the first main spindle 2, such that the number of left sides of the regular polygon cut off by the straight line in the direction inclined to all sides of the regular polygon is larger than the number of left sides of the regular polygon cut off by the straight line in the direction parallel to a predetermined direction of the regular polygon.

When the regular polygon has odd sides, the second turret 16 may have a shape cut off not only by the straight line in the direction inclined to all sides but also by the straight line facing a predetermined side and in the direction parallel to the predetermined side. Even in this case, the cutout part 18 may be formed by cutting off at least two sides while leaving as many sides as possible.

The second turret 16 thereby has a relatively simple shape, for example, an approximate half-moon shape as seen in the Z axis direction without having a conventional complex shape such as a biconcave lens shape. The number of tool attachment parts 19 is thus increased. The first main spindle 2 may grip the workpiece 4 while the axis line thereof is aligned with or is offset relative to the axis line of the second main spindle 3. For this reason, the movement path 20 is formed to allow the movement of the second main spindle 3 in the Z axis direction to pass through the second turret 16 while the second main spindle 3 is positioned coaxially with the first main spindle 2 or is offset relative to the axis line of the first main spindle 2.

In the automatic lathe 1, an indexing device 23 (see FIG. 1) is provided in the controller 21. The indexing device 23 turns each of the turrets 11, 16 for each predetermined indexed angle, and sequentially indexes each of the tool attachment parts 14, 19.

The indexing device 23 is configured to, for each switch operation, turn the first turret 11 or the second turret 16 for each predetermined indexed angle and stop the first turret 11 or the second turret 16 when the first turret 11 or the second turret 16 is selectively set, and an operator operates a switch (not shown) provided in the controller 21. The tool attachment part 14 or the tool attachment part 19 sequentially faces the first main spindle 2 or the second main spindle 3 by the turning and stop for each indexed angle.

The indexing device 23 may be configured to appropriately set the turning direction of the first turret 11 or the second turret 16 with a switch or the like. For example, the first turret 11 or the second turret 16 turns in the clockwise direction or the counterclockwise direction by setting the turning direction in the clockwise direction or the counterclockwise direction in FIG. 2. The second turret 16 therefore turns in the set turning direction. The first turret or the second turret 16 turns by appropriately switching the turning direction.

Figure 4A:
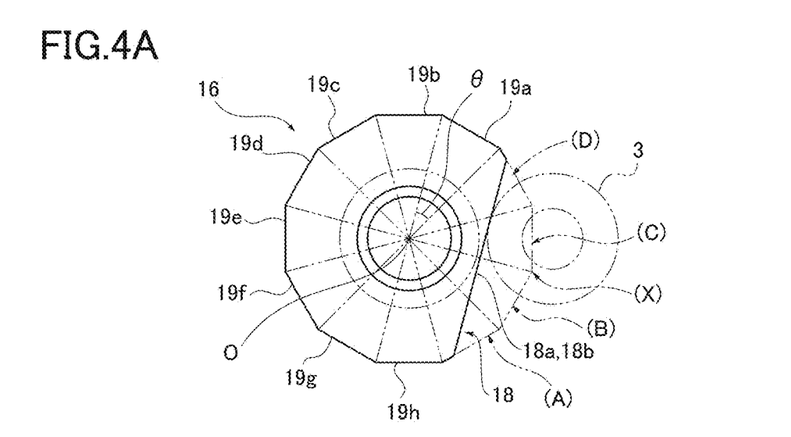
FIG. 4A is a view describing the turning of the second turret by an indexing device, which forms no movement path.
Figure 4B:
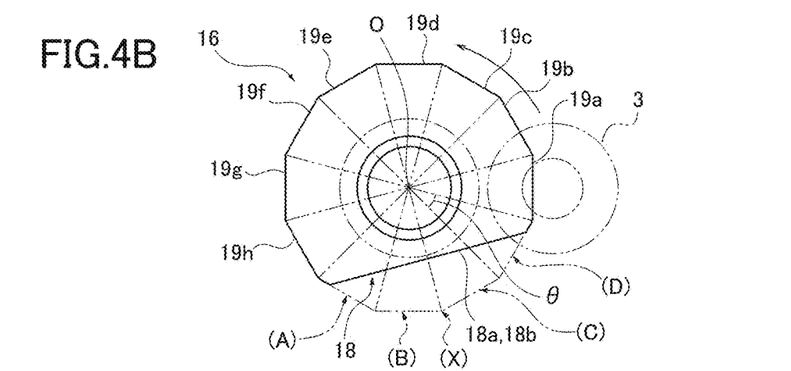
FIG. 4B is a view describing the turning of the second turret by the indexing device, and illustrating one indexed tool attachment part adjacent to the cutout part.
Figure 4C:
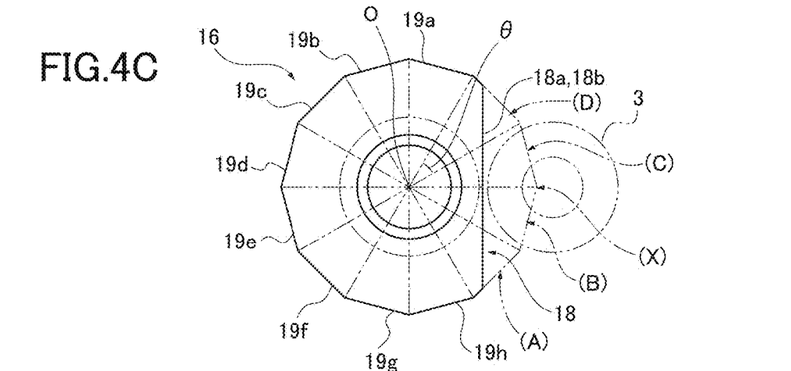
FIG. 4C is a view describing the turning of the second turret by the indexing device, which forms the movement path.

As illustrated in FIGS. 4A to 4C, in the present embodiment, the second turret 16 includes eight tool attachment parts 19a to 19h. As the second turret 16 is formed based on the regular dodecagon, the indexed angle $\theta$ ($\theta$ in FIG. 4A to 4C) is 30 degrees which is the same as the center angle of the regular dodecagon. When the operator performs the switch operation after the second turret 16 is set, the second turret 16 turns by 30 degrees for each switch operation. The operator therefore manually indexes a predetermined tool attachment part 19 with the indexing device 23 by operating the switch. The operator thus easily mounts the tool on the indexed tool attachment part 19, and adjusts the mounted tool.

Each of the tool attachment parts 19 of the second turret 16 is formed according to each of the left sides of the partially cut regular dodecagon. The side corresponding to each tool attachment part 19 therefore follows the Y axis direction (see FIG. 2) as seen in the Z axis direction when a predetermined tool attachment part 19 is indexed.

When the second turret 16 constantly turns for each indexed angle $\theta$ (in this embodiment, $\theta=30$ degrees), as illustrated in FIG. 4A, the second turret 16 is not positioned such that the flat surface 18b follows the ZY plane and the edge 18a follows the Y axis direction. For this reason, the movement path 20 is not formed by a normal manual operation.

The indexing device 23 is therefore configured to position the second turret 16 such that the edge 18a of the cutout part 18 follows the Y axis direction by turning the second turret 16 at an angle different from the indexed angle of the tool attachment part 19 as illustrated in FIG. 4C when the switch operation is performed after the tool attachment part 19a, 19h (tool attachment part 19a in FIG. 4B) adjacent to the cutout part 18 illustrated in FIG. 4B is indexed. In this embodiment, when the second turret 16 turns at the ½ angle of the indexed angle from the position turned at the predetermined indexed angle, the edge 18a follows the Y axis direction (vertical direction), and the cutout part 18 is formed by a straight line at the indexed angle. The edge 18a of the cutout part 18 follows the Y axis direction in the position where the second turret 16 turns at the half angle (15 degrees) of the indexed angle from the predetermined indexed position.

For positioning the cutout part 18, the indexing device 23 therefore turns the second turret 16 by an indexed angle $2\theta$ ($2\times30$ degrees) in the counterclockwise direction from the indexed tool attachment part 19a as illustrated in FIG. 4B, and then further turns the second turret 16 by the half angle of the indexed angle ($\frac{1}{2}$)$\theta$ (15 degrees) in the counterclockwise direction. The second turret 16 thereby turns by $2\theta+$ (½)θ (75 degrees) in the counterclockwise direction, and the cutout part 18 is indexed such that the edge 18*a* follows the Y axis direction.

When the tool attachment part 19*h* is indexed, the indexing device 23 turns the second turret 16 by the indexed angle 2θ (2×30 degrees)+the half angle of the indexed angle (½)θ (15 degrees) in the clockwise direction, so that the cutout part 18 is indexed.

The movement path 20 is thereby formed by the indexing device 23 in response to the manual operation of the operator. The operator thus easily performs the maintenance of the second main spindle 3 while moving the second main spindle 3 via the movement path 20.

The indexing device 23 is configured to form the movement path 20 in response to the manual operation of the operator as described above. With this configuration, the second turret 16 is formed to have, as seen in the Z axis direction, the shape cut off by the straight line in the direction inclined to all sides of the regular dodecagon, and the second turret 16 is provided with as many tool attachment parts 19 as possible.

The second turret 16 may stop due to emergency stop of the automatic lathe 1, for example, such that the edge 18*a* of the cutout part 18 follows the direction crossing the Y axis direction as seen in the Z axis direction when no tool attachment part 19 is indexed. In this case, the indexing device 23 is configured to position the second turret 16 while any of the tool attachment parts 19 (19*a*, 19*h*) adjacent to the cutout part 18 is indexed or the edge 18*a* of the cutout part 18 follows the Y axis direction by the manual operation (switch operation). Consequently, the subsequent indexing and the formation of the movement path 20 are easily performed.

As long as the turning direction of the second turret 16 is switchable between the clockwise direction and the counterclockwise direction, it becomes unnecessary to index the cutout part 18 by turning the second turret 16 to the tool attachment part 19*a* or the tool attachment part 19*h* in the counterclockwise direction or the clockwise direction based on the turning (long way) of the turret in the direction in which the turning angle increases. For indexing the cutout part 18 while the tool attachment part 19*b* to 19*g* is indexed, the turning direction of the second turret 16 is set by the switch operation, and the tool attachment part 19*a* or 19*h* is indexed based on the turning (short way) of the turret in the direction in which the turning angle decreases. For example, when the tool attachment part 19*b* to 19*d* is indexed, the tool attachment part 19*a* is indexed by turning the second turret 16 in the counterclockwise direction. When the tool attachment part 19*e* to 19*g* is indexed, the tool attachment part 19*h* is indexed by turning the second turret 16 in the clockwise direction. After that, by turning the second turret 16 by 2θ+(½)θ in the counterclockwise direction or the clockwise direction, the cutout part 18 is effectively indexed while shortening the turning period.

The second turret 16 may be set to turn only in the counterclockwise direction to index the cutout part 18 after the tool attachment part 19*a* is indexed. In this case, when the tool attachment part 19*b* to 19*h* is indexed, the second turret 16 is turned in the counterclockwise direction for each indexed angle by repeating the switch operation to index the tool attachment part 19*a*. After that, the cutout part 18 is indexed by turning the second turret 16 in the counterclockwise direction by 2θ+(½)θ.

The second turret 16 may be set to turn only in the clockwise direction to index the cutout part 18 after the tool attachment part 19*h* is indexed. In this case, when the tool attachment part 19*a* to 19*g* is indexed, the second turret 16 is turned in the clockwise direction to index the tool attachment part 19*h*. After that, the cutout part 18 is indexed by turning the second turret 16 in the clockwise direction by 2θ+(½)θ. In either case, the turning of the second turret 16 is easily controlled.

The positioning procedure of the second turret 16 by indexing the cutout part 18 such that the edge 18*a* follows the Y axis direction is not limited to the above embodiment. Hereinafter, another embodiment will be described with reference to FIGS. 4A to 4C. As illustrated in FIGS. 4A to 4C, the cutoff part of the second turret 16 is divided into, in order from the tool attachment part 19*h* side, a part (A), a part (B), a part (C), and a part (D) for each indexed angle. A vertex between the part (B) and the part (C) is (X). The edge 18*a* is vertical to the line connecting the vertex (X) and the turning center O of the second turret 16.

One example of the indexing procedure of the cutout part 18 when the tool attachment part 19*a* is indexed as illustrated in FIG. 4B will be described. In response to the switch operation when the tool attachment part 19*a* is indexed, the indexing device 23 turns the second turret 16 by the indexed angle θ in the counterclockwise direction. By this turning, the region (D) of the second turret 16 is indexed to face the second main spindle 3. In response to the next switch operation, the indexing device 23 turns the second turret 16 by the indexed angle θ in the counterclockwise direction. By this tuning, the region (C) is indexed (see FIG. 4A). In response to a further switch operation, the indexing device 23 turns the second turret 16 by the indexed angle (½)θ in the counterclockwise direction. By this turning, the apex (X) is indexed as illustrated in FIG. 4C. The cutout part 18 is indexed such that the edge 18*a* follows the Y axis direction, and the movement path 20 is thereby formed.

After that, when the indexing device 23 indexes each tool attachment part 19, the indexing device 23 turns the second turret 16 by the indexed angle (½)θ in the counterclockwise direction in response to the switch operation to index the region (B). When the switch operation is further repeated, the indexing device 23 turns the second turret 16 by the indexed angle θ in the counterclockwise direction in accordance with the number of switch operations. At first, the region (A) is indexed, and then, the tool attachment parts 19*h*, 19*g*, 19*f*, 19*e*, 19*d*, 19*c*, 19*b*, and 19*a* are sequentially indexed for each turning.

Next, one example of the indexing procedure of the cutout part 18 when the tool attachment part 19*h* is indexed will be described. For each switch operation, the indexing device 23 turns the second turret 16 by the indexed angles θ→θ→(½)θ in the clockwise direction when the tool attachment part 19*h* is indexed. The region (A), the region (B), and the vertex (X) are thereby sequentially indexed, and the cutout part 18 is indexed such that the edge 18*a* follows the Y axis direction. The movement path 20 is thereby formed. After that, when the indexing device 23 indexes each tool attachment part 19, the indexing device 23 turns the second turret 16 by the indexed angles (½)θ→θ in the clockwise direction to sequentially index the region (C) and the region (D) for each switch operation. The indexing device 23 turns the second turret 16 by the indexed angle θ in the clockwise direction in response to the subsequent switch operation to sequentially index the tool attachment parts 19*a*, 19*b*, 19*c*, 19*d*, 19*e*, 19*f*, 19*g*, and 19*h*.

With the configuration which indexes the cutout part 18 by turning the second turret 16 by the indexed angle or the half angle of the indexed angle for each switch operation as the present embodiment, the second turret 16 turns at the indexed angle for selecting the tool while the second turret 16 turns at the half angle of the indexed angle for indexing the cutout part 18. Accordingly, the tool is effectively selected, and also the movement path 20 is effectively formed. The indexing of the cutout part 18 and the turning control for indexing the tool attachment part 19 after the cutout part 18 is indexed are also simply performed.

Although the embodiment of the present invention has been described above, the present invention is not limited thereto. It should be appreciated that variations may be included in the present invention without departing from the scope of the present invention.

What is claimed is:

1. A machine tool comprising:
   a turret including, on a circumferential surface thereof, a plurality of tool attachment parts; and
   a main spindle that holds a workpiece, wherein
   the main spindle is provided in a movable manner along an axis line,
   the turret is provided in a turnable manner to index each of the tool attachment parts relative to the main spindle,
   the turret includes a predetermined cutout part,
   a movement path for the main spindle to pass through the turret is formed by turning the turret such that the cutout part faces the main spindle,
   the cutout part includes one plane along the axis line,
   the turret includes, on a circumferential surface thereof except for on the cutout part, the tool attachment parts,
   the turret includes, as seen in an axis line direction, a shape in which a part of a regular polygon centered at a turning center is linearly cut off by an edge of the cutout part,
   the edge is, as seen in the axis line direction, a straight line in a direction crossing each side of the regular polygon, and
   each tool attachment part is disposed according to each side left in the regular polygon cut off by the cutout part.

2. The machine tool according to claim 1, further comprising:
   an indexing device that turns the turret for each predetermined indexed angle to sequentially index each of the tool attachment parts, wherein
   the indexing device is configured to index the cutout part to face the main spindle by turning the turret at an angle different from the indexed angle according to the straight line formed by the edge of the cutout part.

3. The machine tool according to claim 2, wherein the indexing device is configured to position the turret to form the movement path such that the edge of the cutout part follows an axis direction forming a rectangular coordinate system on a vertical plane with the axis line after a tool attachment part adjacent to the cutout part is indexed.

4. The machine tool according to claim 2, wherein the indexing device is configured to position the turret to form the movement path by turning the turret at an angle at which the edge of the cutout part follows an axis direction forming a rectangular coordinate system on a vertical plane with the axis line after the turret is sequentially turned for each indexed angles.

5. The machine tool according to claim 2, wherein the edge of cutout part is the straight line at an angle at which the cutout part is indexed by turning the turret at a half angle of the indexed angle.

* * * * *